(Model.)
A. H. McDOWELL.
FISH TRAP.
No. 375,175. Patented Dec. 20, 1887.
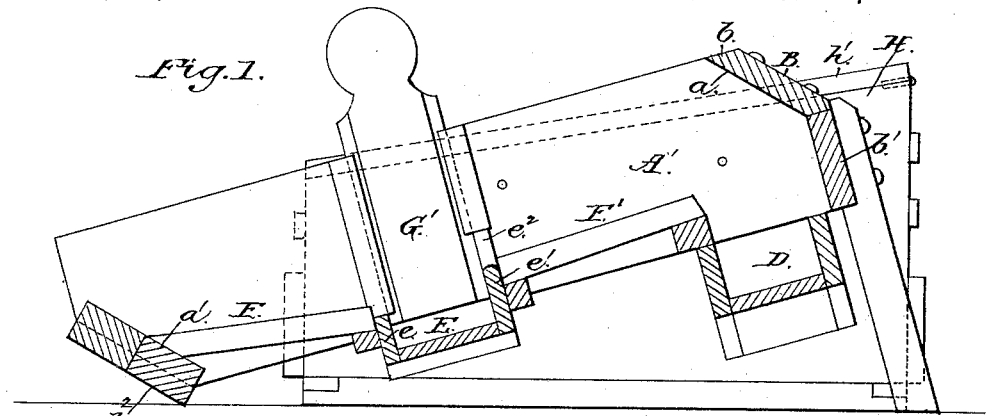
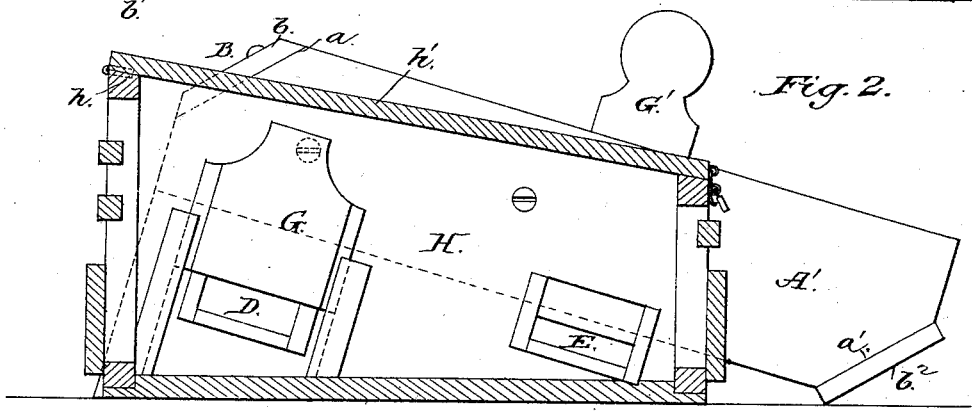
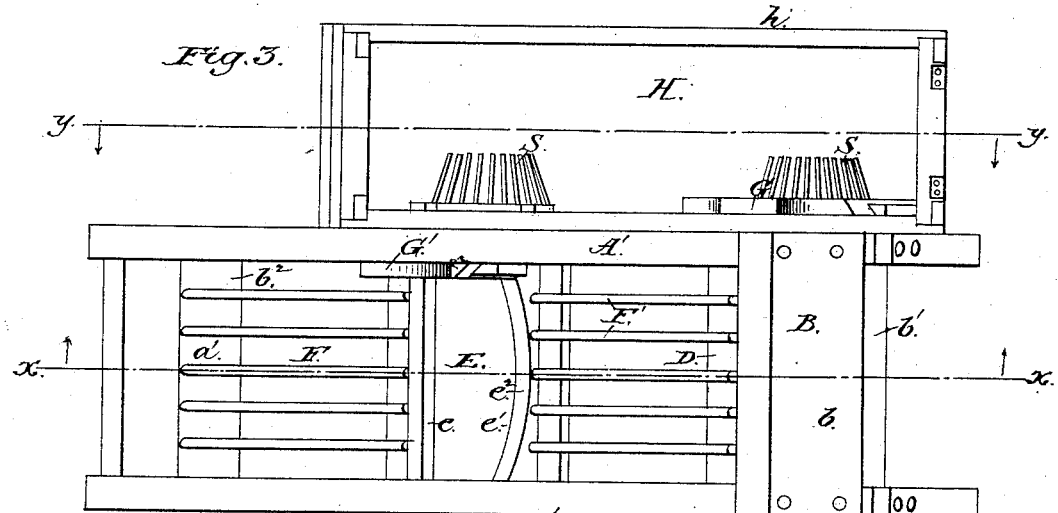
WITNESSES:
John A. Ellis
E. M. Clark
INVENTOR:
A. H. McDowell
BY Munn & Co.
ATTORNEYS.

UNITED STATES PATENT OFFICE.

ABNER H. McDOWELL, OF PROGRESS, VIRGINIA.

FISH-TRAP.

SPECIFICATION forming part of Letters Patent No. 375,175, dated December 20, 1887.

Application filed July 27, 1887. Serial No. 215,435. (Model.)

*To all whom it may concern:*

Be it known that I, ABNER HENRY McDOW-ELL, of Progress, in the county of Franklin and State of Virginia, have invented a new and Improved Fish-Trap, of which the following is a full, clear, and exact description.

My invention relates to an improvement in fish-traps, and has for its object to provide a simple, inexpensive, and effective device whereby fish may be caught at low or high tide and be safely retained in the trap until removed by the proper parties, and wherein all danger of the fish being stolen is avoided.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a longitudinal vertical section through line $x\ x$ of Fig. 3. Fig. 2 is a similar section on line $y\ y$ of Fig. 3; and Fig. 3 is a plan view of the device, the cover of the fish-box being removed.

In carrying out the invention the trap proper is constructed of two beams or side pieces, A and A', supported at an inclination from rear to front, the said side pieces being chamfered at their upper rear edges, as at $a$, and likewise at their lower front edges, as at $a'$. At the rear a hood, B, is formed by attaching transversely to the side pieces, at the chamfer $a$, a strip, $b$, and below it, and in contact with said strip $b$, a second vertical strip, $b'$, extending down to the bottom of the side pieces. At the front chamfered edges, $a'$, a transverse beam, $b^2$, is secured, as shown in Fig. 1. At the bottom of the inclined side pieces in the rear a box, D, is provided, adapted to serve as a fish-guide, which box is closed at one end and open at the other, the side pieces being beveled from said closed end downward to the open end.

In attaching the box D to the side pieces, A and A', the closed end is left flush with one side piece, A, and the open end is made to project at an angle downward and outward beyond the opposite side piece, A'. Thus the box or passage has an inclination downward and outward as well as a downward and forward inclination.

About centrally or transversely the trap a second box or passage, E, is attached to the side pieces, A A', at a downward and outward inclination, also closed at one end and open at the other, the open end, like the passage D, extending beyond the side piece A', and inclined in substantially the same manner. The sides $e\ e'$ of the passage E are made of unequal height, the front side, $e$, being quite low and the rear side, $e'$, high and centrally concaved, as at $e^2$, and shown in Fig. 3.

A series of spaced longitudinal bars, F, are fastened at their ends, respectively, to the front side, $e$, of the passage E, and to the inclined front beam, $b^2$, and a similar series of bars, F', are provided, secured at their ends to the front side of the passage D and to the rear or recessed side of the guide E, the tops of the bars F' being adapted to be in about the same plane with the concavity $e^2$ in the guide E, as shown in Figs. 1 and 3.

A box-like receptacle, H, is attached to the side piece A', adapted to hold the fish, having a flat bottom and slotted sides to admit the water, and an inclined top, $h$, covered by a hinged lid, $h'$, which lid is locked to the receptacle, as shown in Fig. 2, in any approved manner.

Through the side of the receptacle H, secured to the trap side A' and near the bottom, the open ends of the passages D and E are introduced, a door, G, being provided within the receptacle, to slide downward and close the aperture, through which the passage D is entered when desired, and a similar door, G', is provided within the trap, to shut down within the passage E. The receptacle H is made to extend from forward the center of the trap beyond the rear.

In operation the trap is set, preferably, in a swift current, with the front end of the trap $b^2$ and also the front ends of the slats a little below the water, the doors G G' being opened. The fish, in attempting to come up the stream in their endeavors to find stiller water, swim under the trap, and as they further attempt to go up the current are washed back on the slats and into the passages E and D. The fish in coming downstream are caught in the same manner.

At the mouth of each passage within the receptacle H a hack, S, is attached, consisting of a number of wires pointed at their ends, inclosing the said mouth and projecting in conical form within the said receptacle, (shown in Fig. 3,) an opening being left at the apex. Thus the fish, while they may freely enter the receptacle H, cannot escape therefrom.

The rear end of the trap is entirely out of the water except in case of high water.

The operator may by raising the lid observe if the catch is sufficient; if so, the doors G G' are closed and the lid of the receptacle H locked, whereupon the fish are securely kept prisoners in their element, and may be removed at pleasure.

Having thus fully described my invention, what I claim as new, and desire to secure by Letters Patent, is—

1. In a fish-trap, the combination, with the trap consisting of the inclined sides A A', the hood B, and transverse front beam, $b^2$, the inclined rear passage, D, having sides of equal height, the inclined forward passage E, having the rear side of greater height than the forward side, and the longitudinal cage-bars F F', of the laterally-slotted fish-receptacle H, which the lower ends of said passages enter, as shown and described.

2. In a fish-trap, the trap proper, consisting of the inclined sides A A', the hood B, and transverse front beam, $b^2$, the downwardly and forwardly inclined passages D and E, having one end open and the other closed, their open ends projecting beyond the sides of the trap, and the said passage D being provided with sides of equal height, and the other passage having a low front side and elevated rear side centrally concaved, and the longitudinal bars F F', of the laterally-slotted fish-receptacle H, which the open ends of the said passages enter, and the sliding doors G G', which are applied to the respective passages D E, as shown, and for the purpose specified.

ABNER H. McDOWELL.

Witnesses:
J. A. DUPUY,
G. E. DENNIS.